United States Patent
Wert

(10) Patent No.: US 12,429,082 B2
(45) Date of Patent: Sep. 30, 2025

(54) MAGNETIC LYNCH PIN

(71) Applicant: Daniel Wert, Newville, PA (US)

(72) Inventor: Daniel Wert, Newville, PA (US)

( * ) Notice: Subject to any disclaimer, the term of this patent is extended or adjusted under 35 U.S.C. 154(b) by 134 days.

(21) Appl. No.: 18/120,457

(22) Filed: Mar. 13, 2023

(65) Prior Publication Data

US 2024/0309900 A1  Sep. 19, 2024

(51) Int. Cl.
*F16B 21/14*  (2006.01)

(52) U.S. Cl.
CPC .......... *F16B 21/14* (2021.08); *A44D 2203/00* (2013.01); *Y10T 24/32* (2015.01)

(58) Field of Classification Search
CPC ...... A44D 2203/00; Y10T 24/32; F16B 21/12
USPC ...... 411/351; 280/515; 248/309.4, 683, 537, 248/206.5
See application file for complete search history.

(56) References Cited

U.S. PATENT DOCUMENTS

| | | | | |
|---|---|---|---|---|
| 2,414,653 A * | 1/1947 | Lookholder | ............. | A47K 1/09 211/DIG. 1 |
| 2,627,423 A * | 2/1953 | Copeman | ................. | B60D 1/02 37/417 |
| 3,159,372 A * | 12/1964 | McIntosh | ................. | A47G 1/17 403/345 |
| 3,401,587 A * | 9/1968 | Kalls | ..................... | H01F 7/0252 411/351 |
| 3,658,369 A * | 4/1972 | Barnes | ..................... | F16B 21/12 403/379.2 |
| 4,087,112 A * | 5/1978 | Lee, Jr. | ..................... | B60D 1/02 D8/382 |
| 4,483,550 A * | 11/1984 | Dubbe | ................... | B60D 1/025 411/351 |
| 4,890,854 A * | 1/1990 | Hoover | ..................... | B60D 1/02 D8/382 |
| 5,102,003 A * | 4/1992 | Oswald | .............. | F01M 11/0408 220/230 |
| 7,878,526 B1 * | 2/2011 | Jantzen | ..................... | B60D 1/06 280/491.5 |
| 8,167,263 B1 * | 5/2012 | Zampelli | ............... | H01F 7/0252 410/116 |
| 8,267,420 B2 * | 9/2012 | Merten | ..................... | B60D 1/02 280/514 |
| 2015/0234201 A1 * | 8/2015 | Levesque | ............... | G02C 11/00 24/303 |
| 2016/0015146 A1 * | 1/2016 | Accarrino | .............. | A45D 24/38 224/267 |
| 2019/0055977 A1 * | 2/2019 | Gingold | .................... | F16B 1/00 |
| 2023/0311779 A1 * | 10/2023 | Bergren | .................... | B60R 9/00 224/570 |

* cited by examiner

*Primary Examiner* — Flemming Saether
(74) *Attorney, Agent, or Firm* — David L. Nocilly; Bond Schoeneck & King PLLC

(57) ABSTRACT

A lynch pin device capable of being attached to another surface between uses. The device having a head with a hole or holes through the side wherein a wire can be attached to the head. A shank extends from the head and is of adequate length and width as to fit into an axle or hasp. One or more magnets can be secured to the head, shank, or wire of the lynch pin so that the lynch pin can attach to another surface between uses. A spring may be used to allow the wire to temporarily extend away from the shank when a force is applied.

7 Claims, 3 Drawing Sheets

MAGNETIC LYNCH PIN

BACKGROUND

1. Field

The present disclosure relates to a device that can be secured in a convenient location between uses and, more particularly, to a lynch pin that can secure machine components and be magnetically attached to another surface when not in use.

2. Description of the Related Art

Lynch pins are a popular device used to secure parts in a position, often found in use on farm equipment, such as wheel axles, tractor hitches, landscaping trailers, open trailers, airplanes, logging equipment, and the like. These pins act as fasteners to selectively couple machinery together and are intended to be removed and reinstalled as needed. While the pins are useful, they are easily lost due to their removable nature. When fastening and unfastening machinery, the lynch pin is removed and set aside, often on the ground, which makes misplacing the lynch pin highly probable. Accordingly, there is a need in the art for a lynch pin that can be attached to the nearby piece of equipment when it is not in use so that it can be more readily found and used.

BRIEF SUMMARY

The present disclosure provides a lynch pin that can be magnetically attached to a vehicle or piece of equipment so that a user does not misplace it. The lynch pin comprises a head having a pair of offset holes for engaging a rigid wire loop. A shank extends from the head and is of adequate length and width as to fit into a hole formed through the equipment to be secured in place, such as an axle, three point hitch, or hasp. One or more magnets are secured to at least one of the head or shank of the lynch pin so that the lynch pin can be magnetically attached to a nearby surface when not in active use or when equipment is being disconnected and then connected together. In another embodiment, the present invention is a method of securing a lynch pin, comprising the steps of removing a lynch pin including an elongated shank having a first end and a second end, a head coupled to said first end of said shank, a wire pivotally attached to said head, and a magnet coupled to at least one of said head and said shank from a piece of equipment and then attaching the lynch pin to a magnetic surface using said magnet.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION

Figure 1:
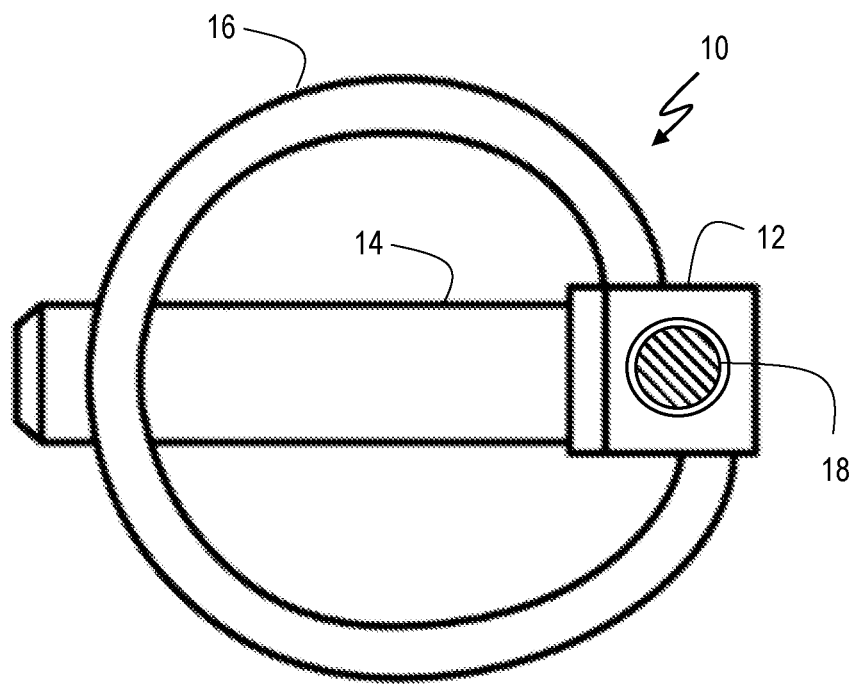
FIG. 1 is a top plan of a lynch pin device according to the present invention in a stored position.

Referring to the figures, wherein like numerals refer to like parts throughout, there is seen in FIG. 1 a lynch pin 10, also known as a three point hitch pin or quick pin, having a head 12 and shank 14 coupled to and extending from head 12. Head 12 generally has a width larger than that of shank 14, which is dimensioned to be inserted in a hole formed in an axle, hitch, or other piece of machinery or equipment for attaching to another item or device. Head 12 includes a pair of holes formed on either side that receive an annular wire 16 that is formed from a rigid material. Wire 16 is attached to holes (not shown) on either side of head 12, and holes may be offset to impart a spring force to wire 16 to bias wire 16 into engagement with shank 14 to secure lynch pin 10 in place during use. Shank 14 is preferably of such a width and length as to allow shank 14 to fit into a hole formed into an axle, hasp, or other piece of equipment to secure a second piece of equipment in place. As is known in the art, lynch pin 10 may be formed from a rigid material, such as steel, to provide the high shear strength needed for mechanical, agricultural, commercial, and residential applications.

Figure 2:
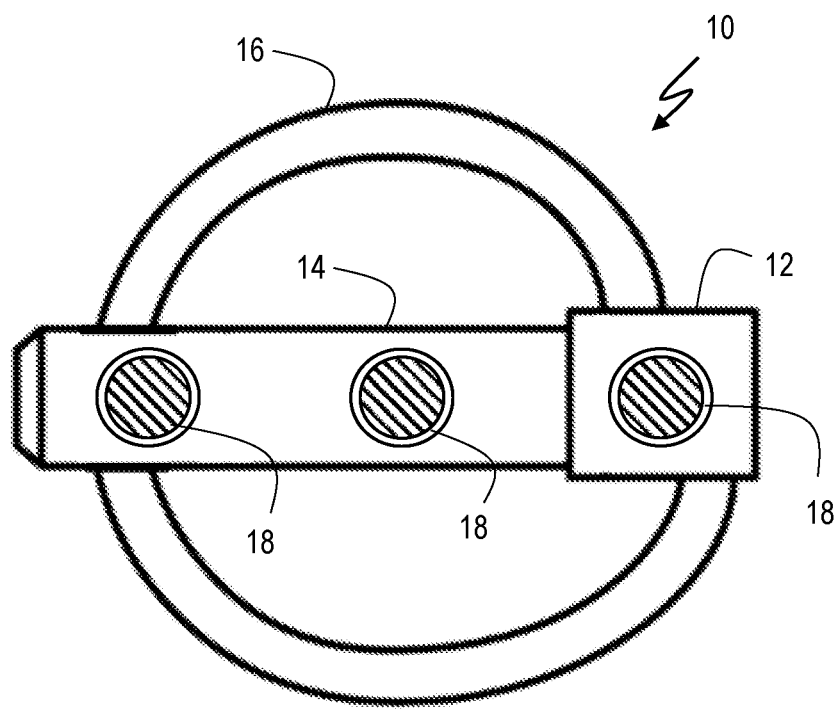
FIG. 2 is a bottom plan of a lynch pin device according to the present invention in a stored position.
Figure 3:
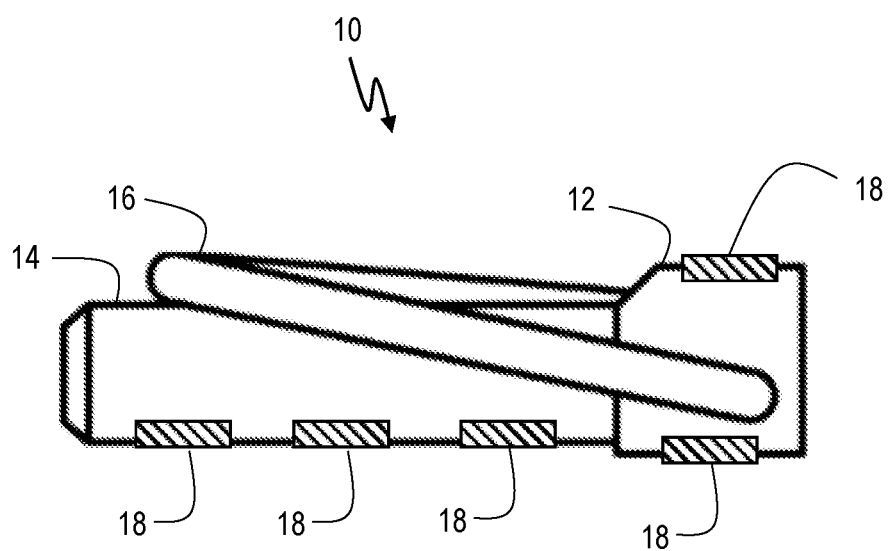
FIG. 3 is a side plan of a lynch pin device according to the present invention in a stored position.

As seen in FIGS. 1, 2, and 3, one or more of a plurality of magnets 18 are coupled to shank 14 and/or head 12. In the present embodiment, magnets 18 are depicted as being coupled to a recessed portion of shank 14 or head 12, but it should be recognized that magnets 18 could be positioned on the surface of head 12, partially recessed in head 12, or completely recessed in head 12 or shank 14 without compromising the use of lynch pin 10. Magnets 18 may be secured in place by welding, solder or adhesives such as epoxy. Magnets 18 may also be secured to head 12 or shank 14 by frictional forces or by snap engagement with corresponding lips and grooves formed into magnet 18 and the recessed portion of shank 14 or head 12, respectively. It should be recognized that the present invention can be implemented in other items comparable to lynch pin 10, such as ring cotters, cotter keys, hitch pins, safety spring pins, clevis pin, detent pin, snapper pin, and the like.

Figure 4:
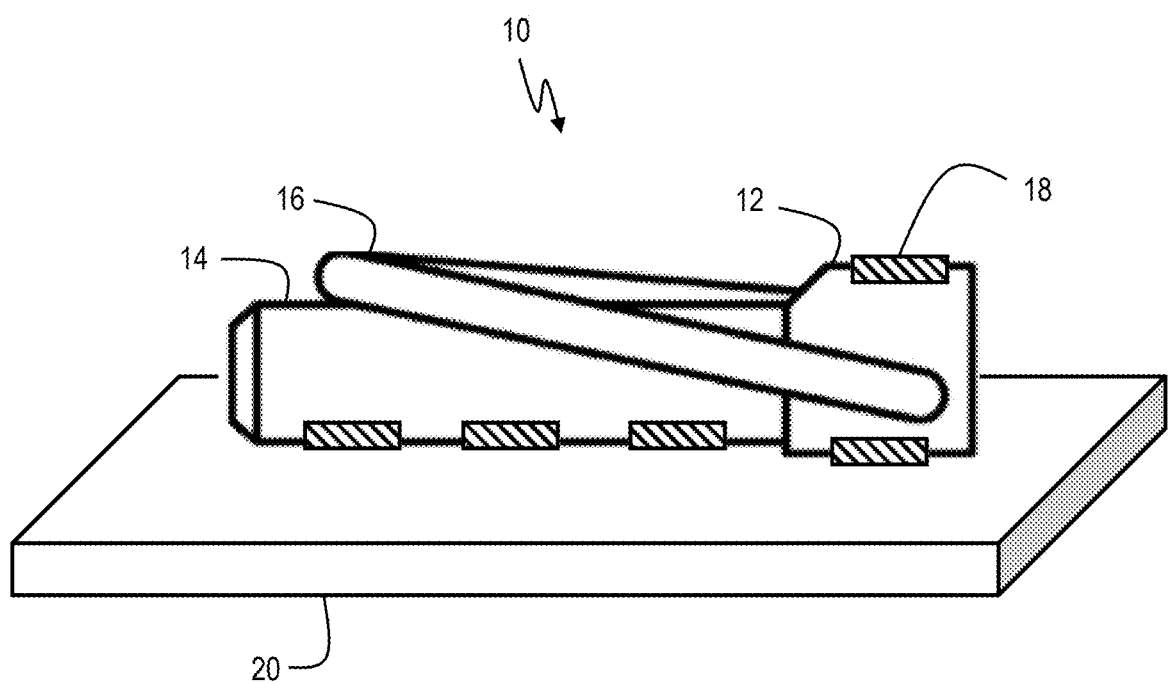
FIG. 4 is a side plan of a lynch pin device attached to a magnetic surface according to the present invention in a stored position.

A user may thus move wire 16 away from shank 14 and place shank 14 into a hole and attach a second item in place to a first item, and then release wire 16 to secure lynch pin 10 in place. Once the equipment no longer needs to be secured, the lynch pin 10 can be removed and temporarily affixed to a vehicle, machine, piece of equipment, or other item having a metal or magnetizable surface 20 (see, e.g., FIG. 4) by way of magnets 18. When lynch pin 10 is to be used again, it may be conveniently located on the surface 20 and separated therefrom for re-insertion into a hole to secure equipment together again.

What is claimed is:

1. A lynch pin, comprising:
   an elongated shank having a first end and a second end;
   a head coupled to said first end of said shank;
   a wire pivotally attached to said head;
   a magnet completely recessed in and coupled to said shank; and
   a second magnet completely recessed in and coupled to said head.

2. The lynch pin of claim 1, wherein said wire is coupled to said head so that said wire is biased into contact with said shank.

3. The lynch pin of claim 1, wherein said head has a diameter larger than that of said shank.

4. The lynch pin of claim 1, further comprising a plurality of magnets coupled to at least one of said head and said shank.

5. A method of securing a lynch pin, comprising the steps of:
- removing a lynch pin including an elongated shank having a first end and a second end, a head coupled to said first end of said shank, a wire pivotally attached to said head, and a magnet coupled to and completely recessed in said shank from a piece of equipment, and a second magnet is completely recessed in and coupled to said head; and
- attaching the lynch pin to a magnetic surface using said magnet.

6. The method of claim 5, wherein said wire is coupled to said head so that said wire is biased into contact with said shank.

7. The method of claim 5, wherein said head has a diameter larger than that of said shank.

* * * * *